Apr. 10, 1923.

E. C. TEAGUE 1,451,599

BRAKE SHOE

Filed Apr. 18, 1922

Inventor
E.C.Teague,
By
Attorney

Apr. 10, 1923.　　　　　　　　　　　　　　　　　　　　1,451,599
E. C. TEAGUE
BRAKE SHOE
Filed Apr. 18, 1922　　　　　　2 sheets-sheet 2

Fig.3ª.

Inventor
E. C. Teague,

By
Attorney

Patented Apr. 10, 1923.

1,451,599

UNITED STATES PATENT OFFICE.

EDWARD C. TEAGUE, OF KANSAS CITY, MISSOURI.

BRAKE SHOE.

Application filed April 18, 1922. Serial No. 554,355.

*To all whom it may concern:*

Be it known that EDWARD C. TEAGUE, a citizen of the United States of America, residing at Kansas City, in the county of Jackson and State of Missouri, has invented new and useful Improvements in Brake Shoes, of which the following is a specification.

The object of the invention is to provide a brake mechanism having a shoe which can not readily be detached from the head and which is not necessarily detached from the head in order to relieve a hot box, and which if detached does not involve the displacement of the means whereby it is secured in place, so that the disadvantages encountered under the present practice of removing the shoe by the trainmen is attending to a hot box and the failure to replace the shoe or the loss or misplacement of the key, in that connection, may be obviated, and the resulting accidents and damage incident to such oversight or neglect may be prevented; and with these objects in view the invention consists in a construction and combination of parts of which a preferred embodiment is shown in the accompanying drawings, wherein:

Figure 1:
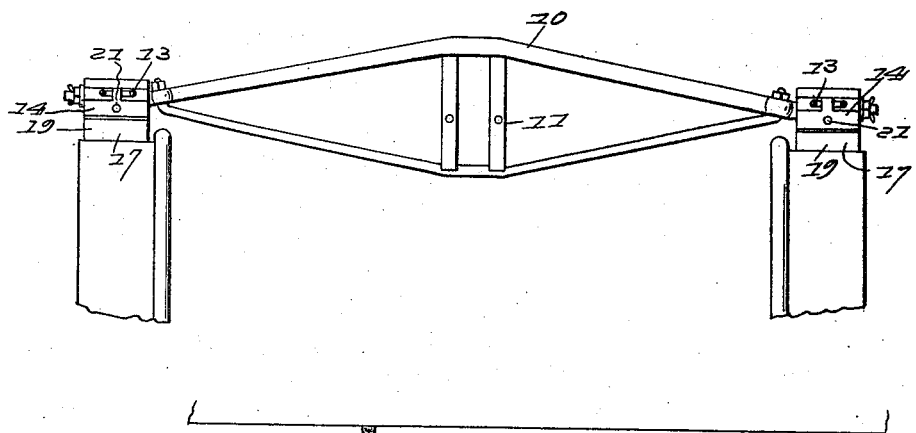
Figure 1 is a plan view of a brake mechanism involving a brake shoe constructed in accordance with the invention.
Figure 2:
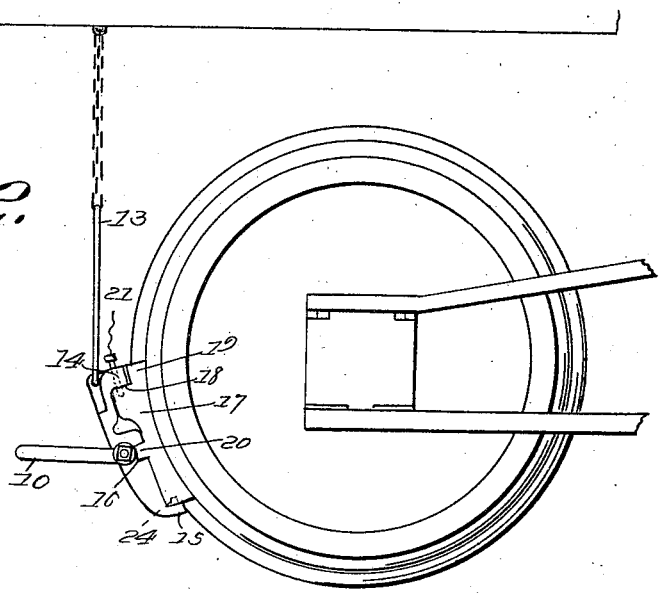
Figure 2 is a side view of the brake mechanism.
Figure 3:
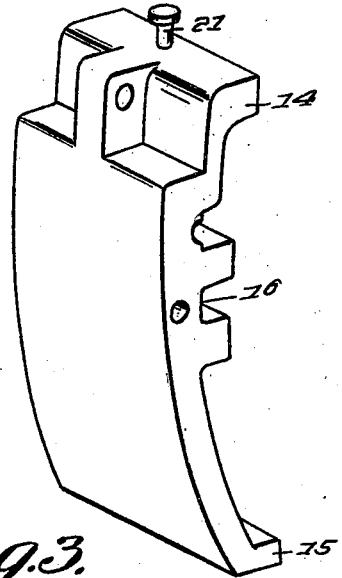

Figures 3 and 3ª are detail views in perspective looking at opposite sides of the brake head.

Figure 4:
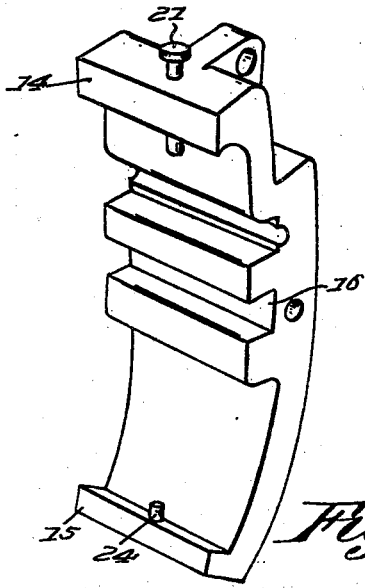
Figure 4:
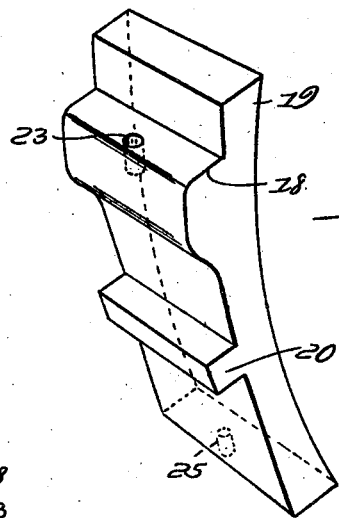

Figure 4 is a similar view of the brake shoe.

Figure 5:
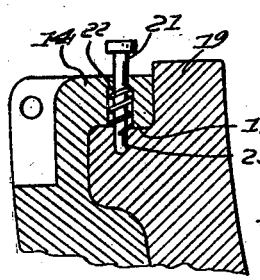

Figure 5 is a detail sectional view taken vertically through the head and the attached shoe and in the plane of the spring actuated locking pin.

The brake beam 10 having the usual truss brace 11 is provided at its extremities with the brake heads, each of which is supported by hangers 13 as in the ordinary construction and is provided at its upper and lower ends with forwardly extending lips 14 and 15 and with an intermediate transverse seat 16. The brake shoe 17 is constructed to seat at its lower end on the upper surface of the lower lip 15 of the brake head and is shouldered as at 18 near its upper end to extend under the upper lip 14 of the brake head, the upper extremity of the brake shoe as indicated at 19 being arranged in overlapping relation with the edge of said upper lip. Also at an intermediate point the brake shoe is provided with a tongue 20 to fit into the seat 16 of the brake head and thus constitute an interlocking engagement therewith to provide against relative longitudinal or up and down displacement of the head and shoe.

Mounted in the forwardly directed upper lip 14 of the brake head is a locking pin 21 permanently secured against displacement and provided with an actuating spring 22 serving to yieldingly hold the pin in an inwardly extended position with its extremity in engagement with a socket 23 formed in the shoulder 18 near the upper end of the shoe while carried by the lower lip 15 of the head is an upwardly directed stud 24 for engagement with a socket 25 in the lower end of the shoe and necessitating the application of the shoe to the head by first engaging the lower end of the former with the stud and then swinging the upper end thereof toward the head until it is in a position to be engaged by the spring actuated locking pin.

To dismount the shoe from the head it is, therefore, necessary to first raise the locking pin sufficiently to disengage it from the socket 23 and then swing the upper end of the shoe away from the head sufficiently to withdraw the shoulder 18 from beneath the lip 14 and at the same time withdraw the tongue 20 from engagement with the seat 16 whereupon the shoe may be lifted out of engagement with the stud 24, but the locking pin remains in place and is, therefore, not subject to displacement or loss through accident or neglect, and when in engagement with the shoe the pin is not subject to displacement by vibration with the consequent risk of dropping the shoe and causing derailment. The tendency of trainmen, therefore to remove the shoe in giving attention to a hot box or other matter relating to the running gear of the car is reduced and when such displacement is necessary it is obvious that the misplacement or loss of the locking pin or key is prevented and the subsequent or resultant tendency to replace the shoe without properly locking it in its position is minimized due to the fact that an interlocking engagement of the shoe necessitating a special manipulation thereof is required.

Furthermore the weight of the shoe is carried directly by the head and is not dependent upon the key or locking pin so that a locking means of comparatively light construction may be utilized in this connection whereas displacement of the shoe is less likely to occur.

Having described the invention, what is claimed as new and useful is:—

1. A brake mechanism having a head and a brake shoe removably seated upon and having an interlocking engagement therewith, and a spring actuated locking pin for securing the shoe in its interlocked relation with the head, the head having upper and lower forwardly projected lips of which the latter is provided with an upwardly extending stud for engagement with a socket in the lower end of the shoe, and the former carries the locking pin for engagement with a socket in an underlapping shoulder of the shoe.

2. A brake mechanism having a head and a brake shoe removably seated upon and having an interlocking engagement therewith, the head being provided at its upper and lower ends with forwardly projecting lips and at an intermediate point with a transverse seat, the shoe having its lower end seated on the upper face of the lower lip and provided with a pin and socket engagement therewith and being provided with an intermediate transverse tongue engaged in said seat and with a shoulder adjacent its upper end, said shoulder being overhung by the upper lip of the head, and releasable latch means carried by said upper lip and engaging said shoulder.

In testimony whereof he affixes his signature.

EDWARD C. TEAGUE.